June 2, 1970 J. SZABO 3,515,907
ELECTRONIC LATCHING NETWORKS
Filed Nov. 9, 1967

John Szabo
INVENTOR.
BY
AGENT

United States Patent Office
3,515,907
Patented June 2, 1970

3,515,907
ELECTRONIC LATCHING NETWORKS

John Szabo, Breslau, Ontario, Canada, assignor to Electrohome Limited, North Kitchener, Ontario, Canada Filed Nov. 9, 1967, Ser. No. 681,747
Int. Cl. H03k 3/31
U.S. Cl. 307—286 10 Claims

ABSTRACT OF THE DISCLOSURE

An electronic latching network is constructed using two resistors, a capacitor, and at least two unidirectional conducting devices, trigger devices and switches. The simplest form of the network is when only two switches are employed. In this case, the network has first, second and third terminals. The aforementioned components, except the capacitor, are arranged in four series circuits as follows and with the components being in the order named: (a) the first terminal, a first resistor, a first unidirectional conducting device, a first trigger device and the second terminal; (b) the first terminal, the first resistor, a second unidirectional conducting device, a second trigger device and the third terminal, (c) the first terminal, a second resistor, a first switch, the first trigger device and the second terminal; and (d) the first terminal, the second resistor, a second switch, the second trigger device and the third terminal. A D.C. power source is connected to the first terminal. The capacitor is connected between the first and third series circuits to be charged via the second resistor from the power source and to discharge via either of the trigger devices when the switch in circuit therewith is closed.

This invention relates to electronic latching networks, i.e. to networks which perform electronically, as opposed to mechanically, the function performed by two or more latched push-buttons or switches.

A latched switch system is one in which any switch of the system will remain closed without being held closed until such time as another switch of the system is closed, at which time the former switch will open automatically. In the past many such latched switch systems have been employed in which the automatic opening of the switches has been accomplished by mechanical means. In accordance with this invention, there is provided an electronic latching network in which any closed circuit thereof is caused to open automatically by electrical control in response to the closing of a previously open circuit of the network. An important feature of a latching network embodying this invention is that when one of the control switches of the network is closed causing the circuit controlled thereby to be closed, closing of any other control switch will not cause the circuit controlled thereby to close.

In its two circuit and simplest embodiment, a latching network of this invention employs two resistors, a capacitor, two switches, two unidirectional conducting devices, such as diodes, and two trigger devices, such as trigger diodes. A network of this type (two circuit, one open, one closed) has first, second and third terminals and has the foregoing components except the capacitor arranged in four series circuits. These circuits are as follows with the components being arranged in the order named: (a) the first terminal, a first resistor, a first unidirectional conducting device, a first trigger device and the second terminal; (b) the first terminal, the first resistor, a second unidirectional conducting device, a second trigger device and the third terminal; (c) the first terminal, a second resistor, a first switch, the first trigger device and the second terminal; and (d) the first terminal, the second resistor, a second switch, the second trigger device and the third terminal. A D.C. power source is connected to the first terminal. The capacitor is connected between the first and third series circuits to be charged via the second resistor from the power source and to discharge via either of the trigger devices upon closure of the switch in circuit therewith. The aforementioned first terminal may be, in fact, two terminals, and two D.C. power sources may be provided, one being connected to one terminal and the other to the other terminal.

Figure 1:
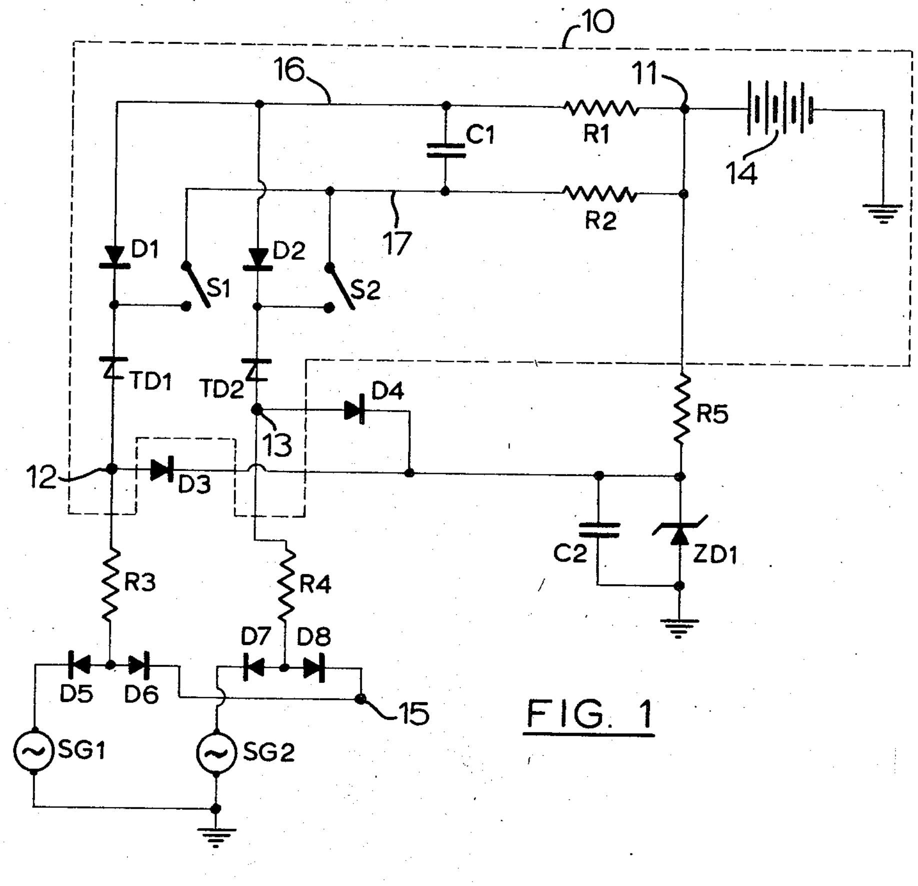
Figure 2:
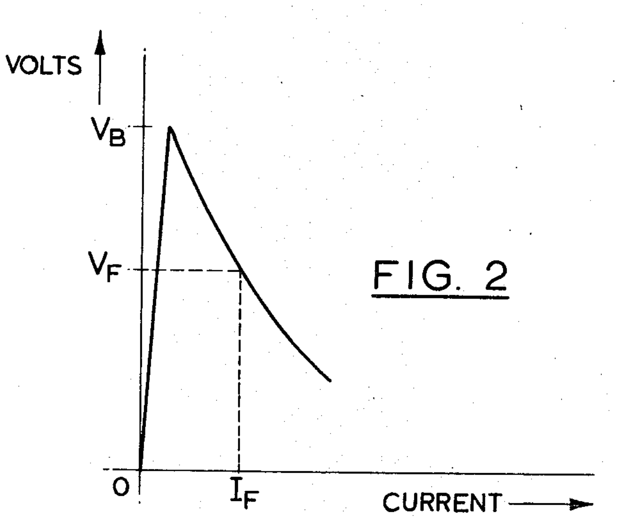

This invention will become more apparent from the following detailed description, taken in conjunction with the appended drawings, in which:

FIG. 1 is a circuit diagram showing an electronic latching network embodying this invention together with an audio network controlled thereby and a clamping network; and FIG. 2 is a graph of voltage against current showing the V–I characteristic of a trigger diode of the type employed in FIG. 1.

Referring to FIG. 1, a latching network embodying this invention is shown within dotted lines 10 and includes a first terminal 11, second and third terminals 12 and 13 respectively, a capacitor C1, two unidirection conducting devices shown as semi-conductor diodes D1 and D2, two trigger devices shown as trigger diodes TD1 and TD2, and two switches S1 and S2. A first series circuit is provided by connecting the following components in the order named: terminal 11, resistor R1, diode D1, trigger diode TD1 and terminal 12. A second series circuit is formed by connecting the following components in the order named: terminal 11, resistor R1, diode D2, trigger diode TD2 and terminal 13. Third and fourth series circuits are provided by connecting the following components in the order named: (a) terminal 11, resistor R2, switch S1, trigger diode TD1 and terminal 12, (b) terminal 11, resistor R2, switch S2, trigger diode TD2 and terminal 13. A D.C. power source shown as a battery 14 has its negative terminal connected to ground and its positive terminal connected to terminal 11. Capacitor is connected between the first and third series circuits and also between the second and four series circuits, the capacitor being connected between the terminals of resistors R1 and R2 remote from common terminal 11 thereof.

It should be noted that while trigger diodes TD1 and TD2 are employed in the latching network of FIG. 1, other trigger devices having a V–I characteristic similar to the V–I characteristic of a trigger diode may be substituted therefor. Thus, neon tubes, four-layer diodes or tunnel diodes could be employed in place of trigger diodes TD1 and TD2. As used herein, a trigger device is intended to mean a device having a breakdown potential followed by a negative resistance characteristic. In addition, while diodes D1 and D2 are shown as being semiconductor diodes in FIG. 1, other unidirectional conducting devices could be substituted therefor.

In combination with the latching network of FIG. 1 is an audio network consisting of signal sources SG1 and SG2, two gates consisting of diodes D5 and D6 and diodes D7 and D8 respectively and an output signal terminal 15. While signal sources SG1 and SG2 have been designated as audio signal sources, it will be appreciated that they may produce signals at frequencies outside of the audio spectrum. One terminal of each signal generator SG1 and SG2 is grounded. The other terminals of the signal generators are connected via their respective gates to output signal terminal 15.

A resistor R3 is connected between terminal 12 and the anodes of oppositely poled diodes D5 and D6, while a resistor R4 is connected between terminal 13 and the anodes of oppositely poled diodes D7 and D8.

In the embodiment of the invention shown in FIG. 1, latching network 10 is used to control the conductivity of the gates and hence to control the nature of the signal appearing at output terminal 15, i.e., to determine whether this signal is derived from signal generator SG1 or signal generator SG2, but this is merely representative of one use to which a latching network of this invention may be put.

Also provided in FIG. 1 is a clamping network consisting of a resistor R5, a Zener diode ZD1, a bypass capacitor C2 and diodes D3 and D4. Zener diode ZD1 is bypassed by capacitor C2 and has its anode connected to ground. The cathode of the Zener diode is connected via resistor R5 to terminal 11. The anodes of diodes D3 and D4 are connected to terminals 12 and 13 respectively, while the cathodes thereof are connected to the cathode of Zener diode ZD1. The clamping network serves the function of clamping the voltage that appears at the one of terminals 12 and 13 that is in circuit with a conducting one of trigger devices TD1 and TD2.

The operation of the networks of FIG. 1 now will be discussed. Battery 14 should produce at its positive terminal a voltage that is in excess of the breakdown potential VB (see FIG. 2) of either trigger diode TD1 or TD2. The voltage of battery 14 should be greater than the breakdown potential of trigger diode TD1 plus the forward voltage drop of diode D1 or, alternatively, greater than the breakdown potential of trigger diode TD2 plus the forward voltage drop of diode D2. For the sake of simplicity, it will be assumed that battery 14 produces a D.C. voltage VS+ at terminal 11. When this voltage is applied to terminal 11, both diodes D1 and D2 will be forward biased via resistors R1 and R2. One of trigger diodes TD1 and TD2 will have a lower breakdown potential, VB, than the other, and this trigger diode will break into conduction. For purposes of explanation, it will be assumed that the breakdown potential of trigger diode TD1 is less than the breakdown potential of trigger diode TD2. This being the case, the application of VS+ to terminal 11 will cause trigger diode TD1 to break down. When this occurs, the voltage appearing on line 16 that connects resistor R1 and diode D1 immediately will be reduced to a voltage VF (see FIG. 2) that is determined by the size of resistor R1 and, in any event, is less than the breakdown voltage, VB, of trigger diode TD2. Trigger diode TD1 now is operating in its negative resistance region, and the current flowing therethrough is designated IF in FIG. 2. Of course, it will be understood that the foregoing description assumes that both switches S1 and S2 are open.

While the voltage on line 16 is held at VF, the voltage on line 17 connecting resistor R2 to switches S1 and S2 will rise to VS+ as a result of the charging of capacitor C1 via resistor R2. If switch S2 now is closed, trigger diode TD2 will break down and conduct heavily as a result of the discharge of capacitor C1 through it. The discharge of capacitor C1 through trigger diode D1 will cause the voltage on line 16 to decrease to a voltage less than the previous voltage VF. When this occurs, diode D1 will be reverse biased momentarily, and, consequently, current flow through trigger diode TD1 will cease immediately. The net result is that switch circuit number 1 consisting of resistor R1, diode D1 and trigger diode TD1 turns off in response to closing switch S2, while the second switch circuit consisting of resistor R1, diode D2 and trigger diode TD2 turns on. If switch S2 now is opened, trigger diode TD2 will continue to conduct and will prevent trigger diode TD1 from firing by holding the voltage on line 16 at a value less than the breakdown potential of trigger diode TD1. However, when switch S2 is opened, capacitor C1 will commence charging towards VS+ via resistor R2. As soon as switch S1 is closed, capacitor C1 will discharge through trigger diode TD1 causing a drop in the voltage on line 16 sufficient to momentarily reverse bias diode D2, thereby cutting off current flow through trigger diode TD2 and automatically switching operation back to the first circuit.

It should be apparent from the foregoing that, upon closure of either switch S1 or S2, the circuit which that switch controls automatically will close and will remain closed even after that switch is opened, until such time as the other switch is closed, thereby closing the other circuit and defeating or opening the first circuit.

It also is a feature of latching network 10 that, while either switch S1 or S2 is held closed, the circuit controlled by the other switch cannot close by closing this other switch. While only two switches S1 and S2 have been shown in the latching network of FIG. 1, it will be appreciated that additional switches and other circuits controlled thereby may readily be added.

When the first circuit of the latching network is closed, a voltage is developed across resistor R3 that forward biases diodes D5 and D6 permitting the signal from signal generator SG1 to reach output terminal 15. At this time no voltage is developed across resistor R4, so diodes D7 and D8 are reverse biased and the gate constituted thereby is open. Similarly, when the second circuit of the latching network of FIG. 1 is closed, a voltage will be developed across resistor R4, the gate constituted by diodes D7 and D8 will be closed, and the signal from signal generator SG2 will appear at output terminal 15, the gate constituted by diodes D5 and D6 being open at this time. The latching network is particularly useful for switching organ pedal tones where it is desirable to restrict operation of the pedal switches to one at a time and where a single frequency divider is used to provide all the notes of the pedal keyboard with a sustain characteristic. When a latching network embodying this invention is used in this manner, capacitor C1 and resistor R2 should be chosen so that the time for charging the capacitor through resistor R2 is short compared to the pedal switch operation rate.

The function of the clamping network now will be explained. In this respect, assume that trigger diode TD2 is conducting and that trigger diode TD1 is non-conductive. Under these circumstances, if switch S2 were repeatedly opened and closed, capacitor C1 would discharge through trigger diode TD2 upon each closure of switch S2, and, if it were not for the clamping network, the result would be the delivery of an undesirable pulse through diode D8 to output terminal 15. With the clamping network provided, the voltage appearing at terminal 13 while trigger diode TD2 is conducting remains at a constant level equal to the forward voltage drop of diode D4 plus the reference voltage developed across Zener diode ZD1. Diode D3 is reverse biased when trigger diode TD1 is not conducting, thereby preventing the reference voltage across Zener diode ZD1 from forward biasing diodes D5 and D6. Of course, when trigger diode TD1 is conductive, the voltage at terminal 12 is clamped to the forward voltage drop of diode D3 plus the reference voltage developed across Zener diode ZD1, diode D4 being reverse biased under these circumstances. Capacitor C2 provides an A.C. bypass path for the audio signal from whichever signal generator is delivering a signal to output terminal 15.

When a latching network embodying this invention is used in conjunction with an electronic organ, it may be necessary for the same tone to be sounded over and over again. This can be accomplished by providing additional gates controlled by switches S1 and S2 between signal generators SG1 and SG2 respectively and output signal terminal 15. These gates are of a character such that they will open and close in response to the opening and closing of switches S1 and S2 respectively, so that in order to sound the note produced by signal generator SG2, for example, over and over again, it only is necessary to repeatedly open and close switch S2.

While a preferred embodiment of this invention has been described herein, those skilled in the art will appreciate that changes and modifications may be made therein without departing from the spirit and scope of this invention as defined in the appended claims.

What I claim as my invention is:

1. An electronic latching network having first and second terminals; a first series circuit including in the order named a first resistor, a first unidirectional conducting device, a first trigger device and said first terminal; a second series circuit including in the order named said first resistor, a second unidirectional conducting device, a second trigger device and said second terminal; a third series circuit including in the order named a second resistor, a first switch, said first trigger device and said first terminal; a fourth series circuit including in the order named said second resistor, a second switch, said second trigger device and said second terminal; a D.C. power source connected to said first and second series circuits via said first resistor and providing a D.C. potential greater than the sum of the forward voltage drop of said first unidirectional conducting device and the breakdown potential of said first trigger device and greater than the breakdown potential of said second trigger device; a capacitor connected between said first and third series circuits to be charged from a D.C. power source via said second resistor and to discharge via either of said switches when closed and the one of said trigger devices in series circuit therewith.

2. The invention according to claim 1 wherein said D.C. power source connected to said first and second series circuits also is connected to said capacitor via said second resistor and provides charging current for said capacitor.

3. The invention according to claim 4 wherein said D.C. power source connected to said first and second series circuits also is connected to said capacitor via said second resistor and provides charging current for said capacitor.

4. An electronic latching network according to claim 1 wherein said capacitor is connected in fifth, sixth, seventh and eighth series circuits; said fifth series circuit including in the order named said first resistor, said capacitor, said first switch, said first trigger device and said first terminal; said sixth series circuit including in the order named said first resistor, said capacitor, said second switch, said second trigger device and said second terminal; said seventh series circuit including in the order named said second resistor, said capacitor, said first unidirectional conducting device, said first trigger device and said first terminal; said eighth series circuit including in the order named said second resistor, said capacitor, said second unidirectional conducting device, said second trigger device and said second terminal.

5. An electronic latching network according to claim 4 wherein said first and second trigger devices are trigger diodes.

6. An electronic latching network according to claim 5 wherein said first and second unidirectional conducting devices are diodes.

7. In combination with an electronic latching network according to claim 1, first and second signal sources; first and second gates; an output signal terminal; means connecting said first gate in circuit between said first signal source and said output signal terminal; means connecting said second gate in circuit between said second signal source and said output terminal; and means connecting said first and second terminals and said first and second gates respectively for opening and closing said gates in response to signals appearing at said first and second terminals.

8. The invention according to claim 7 wherein said first and second gates are diodes.

9. The invention according to claim 7 including a clamping network connected to said first and second terminals for clamping the voltage appearing at the one of said first and second terminals that is in circuit with a conducting one of said trigger devices.

10. The invention according to claim 9 wherein said clamping network includes a source of reference potential and third and fourth unidirectional conducting devices connected between said source of reference potential and said first and second terminals respectively.

References Cited

UNITED STATES PATENTS

| | | | |
|---|---|---|---|
| 3,040,195 | 6/1962 | Jones et al. | 307—287 |
| 3,109,945 | 11/1963 | Riley | 307—286 |
| 3,222,540 | 12/1965 | Reynold | 307—287 |

DONALD D. FORRER, Primary Examiner

H. A. DIXON, Assistant Examiner

U.S. Cl. X.R.

307—247, 259